United States Patent
Nordbruch (10) Patent No.: US 11,537,122 B2
(45) Date of Patent: Dec. 27, 2022

(54) METHOD FOR CONTROLLING A MOTOR VEHICLE REMOTELY

(71) Applicant: Robert Bosch GmbH, Stuttgart (DE)

(72) Inventor: Stefan Nordbruch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 16/999,510

(22) Filed: Aug. 21, 2020

(65) Prior Publication Data
US 2021/0089024 A1  Mar. 25, 2021

(30) Foreign Application Priority Data
Sep. 23, 2019 (DE) .......................... 102019214461.6

(51) Int. Cl.
| | | |
|---|---|---|
| G05D 1/00 | (2006.01) | |
| G05D 1/02 | (2020.01) | |
| H04W 4/44 | (2018.01) | |
| B60W 30/08 | (2012.01) | |
| H04L 9/06 | (2006.01) | |
| H04L 9/00 | (2022.01) | |

(52) U.S. Cl.
CPC .......... *G05D 1/0022* (2013.01); *B60W 30/08* (2013.01); *G05D 1/0016* (2013.01); *G05D 1/0214* (2013.01); *H04L 9/0643* (2013.01); *H04W 4/44* (2018.02); *G05D 2201/0213* (2013.01); *H04L 9/50* (2022.05)

(58) Field of Classification Search
CPC .. G05D 1/0022; G05D 1/0016; G05D 1/0214; G05D 2201/0213; H04W 4/44; B60W 30/08; H04L 9/0643; H04L 2209/38
See application file for complete search history.

(56) References Cited

U.S. PATENT DOCUMENTS

| | | | |
|---|---|---|---|
| 2016/0351056 A1 | 12/2016 | Herbach et al. | |
| 2017/0308082 A1* | 10/2017 | Ullrich | ................. G05D 1/0297 |
| 2018/0074490 A1* | 3/2018 | Park | ................... G06Q 20/3224 |
| 2020/0074061 A1* | 3/2020 | Kim | ..................... G05D 1/0088 |

FOREIGN PATENT DOCUMENTS

| | | |
|---|---|---|
| DE | 102009040221 A1 | 3/2011 |
| DE | 102015109445 B3 | 11/2016 |
| DE | 102015215807 A1 | 2/2017 |
| DE | 102016213961 A1 | 2/2018 |
| DE | 102018107756 A1 | 10/2018 |
| DE | 102017213204 A1 | 2/2019 |
| WO | 2019028464 A1 | 2/2019 |

\* cited by examiner

*Primary Examiner* — Anne Marie Antonucci
*Assistant Examiner* — Jingli Wang
(74) *Attorney, Agent, or Firm* — Norton Rose Fulbright US LLP; Gerard Messina (57) ABSTRACT

A method for controlling a motor vehicle remotely. The method includes: receiving safety condition signals, which represent at least one safety condition that must be satisfied, so that the motor vehicle may be controlled remotely; checking if the at least one safety condition is satisfied; generating remote control signals for controlling the motor vehicle remotely, based on a result of the check as to whether the at least one safety condition is satisfied; and outputting the remote control signals generated. A device, a computer program and a machine-readable storage medium, are also described.

15 Claims, 2 Drawing Sheets

METHOD FOR CONTROLLING A MOTOR VEHICLE REMOTELY

CROSS REFERENCE

The present application claims the benefit of German Patent Application No. DE 102019214461.6 filed on Sep. 23, 2019, which is expressly incorporated herein by reference in its entirety.

FIELD

The present invention relates to a method for controlling a motor vehicle remotely. In addition, the present invention relates to a device, a computer program and a machine-readable storage medium.

BACKGROUND INFORMATION

German Patent Application No. DE 10 2016 213 961 A1 describes a design for controlling a motor vehicle remotely within a parking lot.

German Patent Application No. DE 10 2017 213 204 A1 describes a method and a system for controlling a vehicle remotely.

German Patent Application No. DE 10 2018 107 756 A1 describes systems for outputting a warning signal of a vehicle, in order to warn entities situated in the vicinity.

PCT Application No. WO 2019/028464 A1 describes a vehicle driving autonomously.

SUMMARY

An object of the present invention is to provide a way to control a vehicle remotely in an efficient manner.

This object may be achieved in accordance with example embodiments of the present invention. Advantageous refinements of the present invention are described herein.

According to a first aspect of the present invention, an example method for controlling a motor vehicle remotely is provided, including the following steps:

Receiving safety condition signals, which represent at least one safety condition that must be satisfied, so that the motor vehicle may be controlled remotely;

checking if the at least one safety condition is satisfied;

generating remote control signals for controlling the motor vehicle remotely, based on a result of the check as to whether the at least one safety condition is satisfied;

outputting the remote control signals generated.

According to a second aspect of the present invention, an example device is provided, which is configured to execute all of the steps of the method according to the first aspect.

According to a third aspect of the present invention, an example computer program is provided, which includes commands that, in response to the execution of the computer program by a computer, for example, by the device according to the second aspect, cause it to implement a method according to the first aspect.

According to a fourth aspect of the present invention, a machine-readable storage medium is provided, in which the computer program according to the third aspect is stored.

In accordance with an example embodiment of the present invention, the above-mentioned object may be achieved by checking, prior to remote control of the motor vehicle, whether the at least one safety condition has been satisfied. If this is not the case, then, in particular, the generation of remote control signals for controlling the motor vehicle remotely is refrained from. Preferably, the remote control signals are only generated and outputted, when the at least one safety condition is satisfied.

This produces, for example, the technical advantage that the remote control of the motor vehicle may be carried out safely.

Consequently, in particular, the technical advantage, that a way for efficiently controlling a motor vehicle remotely, is provided.

In one specific example embodiment of the present invention, the remote control signals include control signals for controlling a transverse and/or longitudinal guidance of the motor vehicle.

This may produce, for example, a technical advantage that the motor vehicle may be controlled remotely in an efficient manner.

In one specific example embodiment of the present invention, a step of determining that a motor vehicle should be controlled remotely, is provided.

In this manner, for example, a technical advantage may be produced, that it may be ensured in an efficient manner that a motor vehicle is intended to be controlled remotely.

In the case in which the control signals are control signals for controlling the lateral or the longitudinal guidance of the motor vehicle, one specific embodiment provides that in each instance, the other guidance, that is, the longitudinal guidance or the lateral guidance, be either controlled manually by the driver (which may then be referred to, in particular, as assisted driving), or controlled in an at least semiautomated manner, in order to drive the motor vehicle in an at least semiautomated manner.

Assisted driving means, in particular, that a driver of the motor vehicle permanently carries out either the lateral guidance or the longitudinal guidance of the motor vehicle. The other respective driving task (that is, controlling the longitudinal or the lateral guidance of the motor vehicle) is automatically carried out remotely. Therefore, this means that in the case of assisted driving of the motor vehicle, either the lateral or the longitudinal guidance is controlled remotely in an automatic manner.

The wording "at least semiautomated guidance" includes one or more of the following cases: semiautomated driving, highly automated driving, fully automated driving.

Semiautomated driving means that in a specific situation (for example: driving on an expressway, driving within a parking lot, passing an object, driving within a traffic lane, which is defined by lane markings) and/or for a certain period of time, longitudinal and lateral guidance of the motor vehicle is controlled remotely in an automatic manner. A driver of the motor vehicle does not have to manually control the longitudinal and lateral guidance of the motor vehicle himself/herself. However, the driver should monitor the automatic, remote control of the longitudinal and lateral guidance continuously, in order to be able to manually intervene, if necessary. The driver must be ready at any time to take over the driving of the motor vehicle completely.

Highly automated driving means that for a certain period of time in a specific situation (for example: driving on an expressway, driving within a parking lot, passing an object, driving within a traffic lane, which is defined by lane markings), longitudinal and lateral guidance of the motor vehicle are controlled remotely in an automatic manner. A driver of the motor vehicle does not have to manually control the longitudinal and lateral guidance of the motor vehicle himself/herself. The driver does not have to monitor the automatic, remote control of the longitudinal and lateral guidance continuously, in order to be able to intervene manually, as required. If necessary, a take-over request to the driver for assuming the control of the longitudinal and lateral guidance is outputted automatically, in particular, outputted with adequate time to spare. Thus, the driver must be potentially able to take over the control of the longitudinal and lateral guidance. Limits of the automatic, remote control of the lateral and longitudinal guidance are detected automatically. In the case of highly automated driving, it is not possible to bring about a minimal-risk state automatically in every initial situation.

Fully automated driving means that in a specific situation (for example: driving on an expressway, driving within a parking lot, passing an object, driving within a traffic lane, which is defined by lane markings), longitudinal and lateral guidance of the motor vehicle is controlled remotely in an automatic manner. A driver of the motor vehicle does not have to manually control the longitudinal and lateral guidance of the motor vehicle himself/herself. The driver does not have to monitor the automatic, remote control of the longitudinal and lateral guidance, in order to be able to intervene manually, when necessary. Prior to an end of the automatic remote control of the lateral and longitudinal guidance, a request for the driver to take over the driving task (controlling the lateral and longitudinal guidance of the motor vehicle) is made automatically, in particular, with adequate time to spare. If the driver does not assume the driving task, then a return is made automatically to a minimum-risk state. Limits of the automatic control of the lateral and longitudinal guidance are detected automatically. In all situations, it is possible to return automatically to a minimum-risk system state.

According to one specific example embodiment, it is provided that the at least one safety condition is, in each instance, an element selected from the following group of safety conditions: presence of a predetermined safety integrity level (SIL) or automotive safety integrity level (ASIL) of at least the motor vehicle and an infrastructure, in particular, including a communication path and/or communications components, for controlling a motor vehicle remotely (in particular, with regard to the overall systems in the motor vehicle and infrastructure, as well as, in particular, parts, e.g., components, algorithms, interfaces, etc.; presence of a maximum latency time of a communication between the motor vehicle and a remote control device for controlling the motor vehicle remotely on the basis of the remote control signals; presence of a predetermined computer protection level of a device for executing the method steps; presence of predetermined components and/or algorithms and/or communication options, which are used for executing the method steps; presence of redundancy and/or diversity in predetermined components and/or algorithms and/or communication options, which are used for executing the method steps; presence of predetermined availability information, which indicates an availability of predetermined components and/or algorithms and/or communication options; presence of predetermined quality criteria of the predetermined components and/or algorithms and/or communication options; presence of a plan, which includes measures for reducing faults and/or measures in response to failures of predetermined components and/or algorithms and/or communication options and/or measures for incorrect analyses and/or measures in response to incorrect interpretations; presence of one or more fallback scenarios; presence of a predetermined function; presence of a predetermined traffic situation; presence of predetermined weather, maximum possible time for a specific performance or execution of one method step or a plurality of method steps; presence of a test result, that elements or functions, which are used for executing the method, are presently functioning correctly.

A communication path is, for example, a communication path between the device according to the second aspect, and the motor vehicle. A communication path includes, for example, one or more communication channels.

In one specific embodiment of the present invention, a component, which is used for executing the method according to the first aspect, is an element selected from the following group of components: surround sensor, motor vehicle, infrastructure, remote control device, device according to the second aspect, motor vehicle system, in particular, drive system, clutch system, brake system, driver assistance system, communications interface of the motor vehicle or of the infrastructure, processor, input, output of the device according to the second aspect.

In one specific embodiment of the present invention, a function, which is used for executing the method according to the first aspect, is an element selected from the following group of functions: remote control function, communication function between the motor vehicle and the infrastructure or the remote control device, evaluation function of surround sensor data of a surround sensor, planning function, in particular, travel planning function, traffic analysis function, emissions analysis function.

The following determines, in particular, a computer protection level: activated firewall and/or valid encryption certificate for encryption of a communication between the motor vehicle and the infrastructure or the remote control device, and/or activated virus program including current virus signatures, and/or presence of a protection, in particular, mechanical protection, in particular, anti-intrusion protection, of the computer, in particular, of the device according to the second aspect, or of the remote control device, and/or presence of an option for checking that signals, in particular, remote control signals or surrounding-area signals, have been transmitted correctly, that is, error-free.

An algorithm includes, for example, the computer program according to the third aspect.

Since, in particular, it is checked that redundancy and/or diversity is present in predetermined components and/or algorithms and/or communication options, for example, a technical advantage is provided, that in the case of failure of the corresponding component, for example, a computer, or the corresponding algorithm or the corresponding communication option, nevertheless, safe functioning may be implemented.

In order to ensure that results are correct, according to one specific embodiment, these may be computed several times, for example, and the corresponding results may be compared to each other. For example, it is only determined that the results are correct, if the results agree.

If an odd number occurs several times, then it may be determined, for example, that the result corresponding to the highest number of equal results is correct.

For example, remote control signals are only generated, when it is able to be determined that the result is correct.

In one specific example embodiment of the present invention, the remote control signals are generated only when the at least one safety condition is satisfied.

In one specific example embodiment of the present invention, the check as to whether the at least one safety condition is satisfied is carried out prior to and/or after and/or during one or more predetermined method steps.

In particular, this produces the technical advantage that it may be ensured in an efficient manner, that certain conditions, presently, the safety condition, are satisfied for controlling the motor vehicle remotely prior to and/or after and/or during the execution of the corresponding method steps. Consequently, in particular, the technical advantage is produced, that if the safety condition is met, the remote control of the motor vehicle is then safely possible.

In one specific example embodiment of the present invention, it is provided that after the outputting of the remote control signals, remote control of the motor vehicle is checked on the basis of the outputted remote control signals, in order to detect a fault; in response to the detection of a fault, the remote control being broken off, or emergency remote control signals for controlling the lateral and/or longitudinal guidance of the motor vehicle remotely in an emergency being generated and outputted.

The emergency remote control signals are, for example, such, that in the case of the remote control of the lateral and/or longitudinal guidance of the motor vehicle on the basis of the emergency remote control signals, the motor vehicle is carried over into a safe state, in particular, stopped.

In one specific example embodiment of the present invention, it is provided that after the outputting of the remote control signals, remote control of the motor vehicle is checked on the basis of the outputted remote control signals, in order to detect a fault; in response to the detection of a fault, the remote control being interrupted, or internal motor vehicle emergency remote control signals for controlling the lateral and/or longitudinal guidance of the motor vehicle in an emergency being generated and outputted.

The internal motor vehicle emergency remote control signals are, for example, such, that in the case of the control of the lateral and/or longitudinal guidance of the motor vehicle on the basis of the internal motor vehicle emergency remote control signals, the motor vehicle is carried over into a safe state, in particular, stopped.

Thus, internal motor vehicle emergency control signals are emergency control signals, which the motor vehicle generates itself and/or are generated in the motor vehicle.

For example, this produces the technical advantage that in the event of a breakdown of communication, as well, which corresponds, for example, to an emergency, between the motor vehicle and the device according to the second aspect, that is, a remote control device for controlling the motor vehicle remotely, the motor vehicle may carry itself over into a safe state.

Explanations, which are made in connection with the remote control signals and/or the internal motor vehicle emergency control signals, apply analogously to the emergency remote control signals, and vice versa.

According to a further specific example embodiment of the present invention, the testing of the remote control includes the check as to whether the at least one safety condition is fulfilled; it being determined that a result, which indicates that the at least one safety condition is not met, is a fault.

This produces, for example, the technical advantage that an efficient response may be made, when the at least one safety condition is no longer satisfied during the remote control of the motor vehicle on the basis of the generated remote control signals.

According to one specific example embodiment of the present invention, the testing of the remote control includes a check as to whether a result to be achieved by the remote control is achieved; it being determined that a result of the check as to whether a result to be achieved by the remote control is achieved, which indicates that the result to be achieved by the remote control has not been achieved, is a fault.

For example, this produces the technical advantage that the non-achievement of a result to be achieved by the remote control may be responded to efficiently.

A result to be achieved includes, for example, one or more of the following results: motor vehicle has a predetermined setpoint speed; motor vehicle has a predetermined setpoint acceleration; motor vehicle is located at a predetermined setpoint position; a navigation system of the motor vehicle has a predetermined setpoint target position and/or a predetermined, intended route; a motor vehicle device has assumed a predetermined motor vehicle setting.

According to one specific example embodiment of the present invention, as an additional alternative to interrupting the remote control and to generating and outputting the emergency remote control signals, further remote control signals for controlling the motor vehicle remotely on the basis of the result to be achieved are generated and outputted, in order to still achieve the result to be achieved in the case of controlling the motor vehicle remotely on the basis of the further remote control signals.

This may produce, for example, a technical advantage that a further, efficient possibility that the result to be achieved by the remote control will still be achieved after all.

According to one specific example embodiment of the present invention, emergency plan signals are received, which represent an emergency plan specific to the detected fault; and the emergency remote control signals are generated on the basis of the specific emergency plan.

A technical advantage of this is, for example, that the emergency remote control signals may be generated efficiently. Thus, this means, in particular, that the emergency plan is specifically for the detected fault.

According to one specific example embodiment of the present invention, the determination, that a motor vehicle should be controlled remotely, includes a determination, that the motor vehicle should be controlled remotely at a predetermined time; the check as to whether the at least one safety condition is satisfied including a check as to whether the at least one safety condition is satisfied at the predetermined time.

This produces, for example, a technical advantage that the check as to whether the at least one safety condition is satisfied, may be carried out efficiently. This provides, in particular, the technical advantage that it may be checked, in an efficient manner, if the at least one safety condition will be satisfied at the time, when the motor vehicle is intended to be controlled remotely.

In one specific example embodiment of the present invention, the check as to whether the at least one safety condition is satisfied includes a check as to whether the at least one safety condition is satisfied at a predetermined time.

This may provide, in particular, the technical advantage that it may be checked, in an efficient manner, if the at least one safety condition will be satisfied at the time, when the motor vehicle is intended to be controlled remotely.

For example, time signals are received, which indicate a predetermined time at which the motor vehicle is intended to be controlled remotely.

In one specific example embodiment of the present invention, it is provided that situation signals be received, which represent a situation in which the motor vehicle finds itself; table signals being received, which represent a table that affixes predetermined situations to predetermined requirements for controlling a motor vehicle remotely; the situation, in which the motor vehicle finds itself, being assigned to one of the predetermined situations; the remote control signals being generated on the basis of the requirement for controlling a motor vehicle, corresponding to the one predetermined situation.

A technical advantage of this is, for example, that the remote control signals may be generated efficiently.

According to one specific example embodiment of the present invention, surrounding-area signals are received, which represent a surrounding area of the motor vehicle; the remote control signals being generated on the basis of the surrounding area.

This produces, for example, the technical advantage that the remote control signals may be generated efficiently. In particular, this produces the technical advantage that a surrounding area of the motor vehicle may be taken into account efficiently during the generation of the remote control signals.

According to one specific example embodiment of the present invention, it is checked, on the basis of the surrounding area of the motor vehicle, if a current traffic situation permits remote control of the motor vehicle. In particular, the remote control signals are generated or outputted on the basis of a result of the check as to whether the current traffic situation permits remote control.

For example, remote control of the motor vehicle is refrained from, when the current traffic situation does not permit remote control.

This produces, for example, the technical advantage that other road users in the surroundings of the motor vehicle are not put at risk or injured.

According to one specific example embodiment of the present invention, one or more method steps up to the steps of generating and outputting the remote control signals are executed in the motor vehicle, and/or one or more method steps are executed outside of the motor vehicle, in particular, in an infrastructure, preferably, in a cloud infrastructure.

This produces, for example, the technical advantage that the corresponding method steps may be carried out in an efficiently redundant manner. In particular, this may further increase safety in an advantageous manner.

According to one specific example embodiment of the present invention, one or more method steps are documented, in particular, documented in a blockchain.

A technical advantage of this is, for example, that on the basis of the documentation, this may also be analyzed subsequently after the performance or execution of the method. In particular, documentation in a blockchain has the technical advantage that the documentation is safe from manipulation and falsification.

A blockchain (also block chain) is, in particular, a continuously expandable list of data records, called blocks, which are linked together with the aid of one or more cryptographic methods. In this context, each block contains, in particular, a cryptographically secure hash (standard value of deviation) of the preceding block, in particular, a time stamp and, in particular, transactional data.

According to one specific example embodiment of the present invention, outputting the generated remote control signals includes transmitting the remote control signals over a communications network, in particular, over a wireless communications network, to the motor vehicle.

According to one specific example embodiment of the present invention, the method according to the first aspect includes controlling the motor vehicle remotely on the basis of the generated remote control signals.

In one specific example embodiment of the present invention, it is tested if an entity made up of the motor vehicle and the infrastructure involved in the method, including communication between the infrastructure and the motor vehicle, is safe, so that the motor vehicle and/or a local and/or a global infrastructure and/or communication between the motor vehicle and the infrastructure are tested accordingly. In particular, the remote control signals are generated on the basis of a result of the test.

Thus, this means, in particular, that the components, which are used during the execution of the method according to the first aspect, are tested for safety, that is, as to whether these satisfy specific safety conditions, before the intervention in the vehicle operation is carried out, that is, before the motor vehicle is controlled remotely.

Important or dependent criteria include, for example, one or more of the safety conditions described above.

In one specific example embodiment of the present invention, the remote control signals include adjustment signals for adjusting at least one motor vehicle setting of a motor vehicle device of the motor vehicle.

This produces, for example, the technical advantage that the at least one motor vehicle setting may be adjusted remotely in an efficient manner.

The at least one motor vehicle setting is, for example, in each instance, an element selected from the following group of motor vehicle settings: internal combustion engine setting, in particular, injection parameters, of an internal combustion engine of the motor vehicle; operating state of an electric motor of the motor vehicle; permissible maximum speed of the motor vehicle; permissible maximum acceleration of the motor vehicle; navigation data, in particular, destination and/or route; setting of the motor vehicle lighting.

The at least one motor vehicle device is, for example, in each instance, an element selected from the following group of motor vehicle devices: steering system; brake system; drive system; gear unit; surround sensor system of the motor vehicle, including one or more surround sensors; drive motor; motor vehicle lighting; navigation system.

Therefore, this means that the remote control signals do not necessarily have to control lateral and/or longitudinal guidance of the motor vehicle, but may adjust one or more motor vehicle parameters or motor vehicle settings, in particular, a drive setting and/or navigation setting.

According to one specific example embodiment of the present invention, it is provided that the method according to the first aspect be a computer-implemented method.

According to one specific example embodiment of the present invention, the method according to the first aspect is executed or performed with the aid of the device according to the second aspect.

Device features follow analogously from corresponding method features, and vice versa. Thus, this means that, in particular, technical functions of the device according to the second aspect follow analogously from corresponding instances of technical functionality of the method according to the first aspect, and vice versa.

The wording "at least one" stands, in particular, for "one or more." Exemplary embodiments of the present invention are represented in the figures and explained in greater detail in the description below.

DETAILED DESCRIPTION OF EXAMPLE EMBODIMENTS

Figure 1:
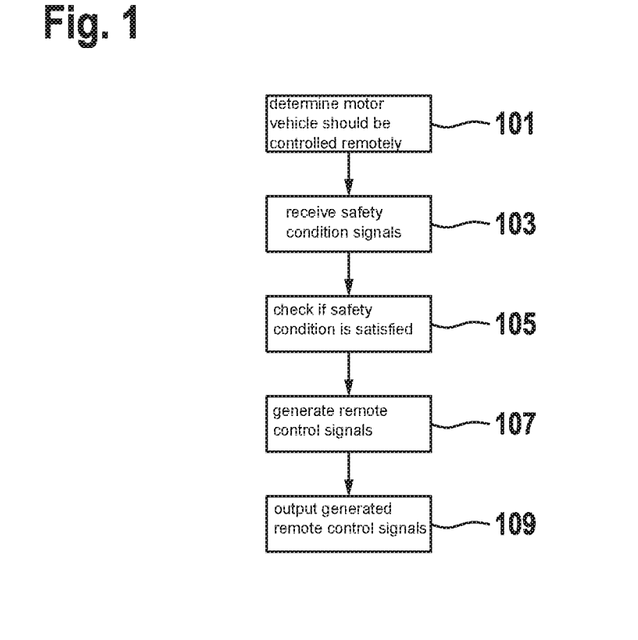
FIG. 1 shows a flow chart of a method for controlling a motor vehicle remotely in accordance with an example embodiment of the present invention.

FIG. 1 shows a flow chart of an example method for controlling a motor vehicle remotely in accordance with an example embodiment of the present invention, including the following steps:

Determining 101 that a motor vehicle should be controlled remotely; receiving 103 safety condition signals, which represent at least one safety condition that must be satisfied, so that the motor vehicle may be controlled remotely;

checking 105 if the at least one safety condition is satisfied;

generating 107 remote control signals for controlling the motor vehicle remotely, based on a result of the check as to whether the at least one safety condition is satisfied;

outputting 109 the remote control signals generated.

At this point, it is noted that the determining step 101 is an optional step. In one further specific embodiment, the determining step 101 may not be included in the method according to the first aspect.

In one specific embodiment, it is provided that request signals be received, which represent a request for controlling a motor vehicle remotely.

According to one specific example embodiment of the present invention, it is determined, in response to the receipt of the request signals, that a motor vehicle is intended to be controlled remotely.

In one specific example embodiment of the present invention, it is provided that situation signals be received, which represent a situation in which a motor vehicle finds itself. According to one specific example embodiment of the present invention, the situation signals are processed, in order to ascertain if the motor vehicle must be controlled remotely. According to one specific example embodiment of the present invention, if it is ascertained that the motor vehicle must be controlled remotely, then it is determined that the motor vehicle is intended to be controlled remotely.

For example, the motor vehicle may be in a situation, which the motor vehicle is not able to resolve or overcome independently. Then, for example, it is determined that the motor vehicle should be controlled remotely.

The result of the check indicates, for example, that the at least one safety condition is satisfied. The result of the check indicates, for example, that the at least one safety condition is not satisfied.

In one specific example embodiment according to the present invention, it is provided that the remote control signals only be generated, when the result of the check indicates that the at least one safety condition is satisfied.

In one specific example embodiment according to the present invention, it is provided that the generation of remote control signals be refrained from, if the result of the check indicates that the at least one safety condition is not satisfied.

According to one specific example embodiment of the present invention, the outputting 109 includes that the generated remote control signals are transmitted over a communications network, in particular, over a wireless communications network, to the motor vehicle.

According to one specific example embodiment of the present invention, the method according to the first aspect includes the step of controlling the motor vehicle remotely on the basis of the outputted remote control signals.

Figure 2:
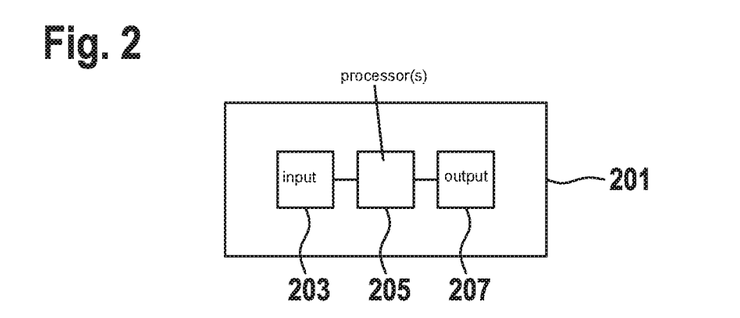
FIG. 2 shows a device in accordance with an example embodiment of the present invention.

FIG. 2 shows a device 201.

Device 201 is configured to execute all of the steps of the method according to the first aspect.

Device 201 includes an input, which is configured to receive the safety condition signals.

Device 201 further includes a processor 205, which is configured to check if the at least one safety condition is satisfied.

In a further specific embodiment (not shown), processor 205 is configured, in particular, to determine that a motor vehicle should be controlled remotely.

Processor 205 is further configured to generate the remote control signals.

Device 201 further includes an output 207, which is configured to output the remote control signals generated.

According to one specific example embodiment of the present invention, device 201 includes a remote control device, which is configured to control the motor vehicle remotely on the basis of the remote control signals outputted.

In general, signals, which are received, are received with the aid of input 203. Thus, input 203 is configured, in particular, to receive the corresponding signals.

In general, signals, which are outputted, are outputted with the aid of output 207. Thus, output 207 is configured, in particular, to output the corresponding signals.

According to one specific example embodiment of the present invention, a plurality of processors are provided in place of the one processor 205.

According to one specific example embodiment of the present invention, processor 205 is configured to execute the generating and checking steps described above and/or in the following.

In one specific example embodiment of the present invention, one or more method steps up to the steps of generating and outputting the remote control signals are executed inside the motor vehicle, and/or one or more method steps are executed outside of the motor vehicle, in particular, in an infrastructure, preferably, in a cloud infrastructure.

Device 201 is, for example, part of an infrastructure, in particular, cloud infrastructure, or part of the motor vehicle.

According to one specific example embodiment of the present invention, for redundant execution of the corresponding method steps, a plurality of devices 201 may be provided, so that, for example, both the motor vehicle and the infrastructure, in particular, the cloud infrastructure, include a device 201.

Figure 3:
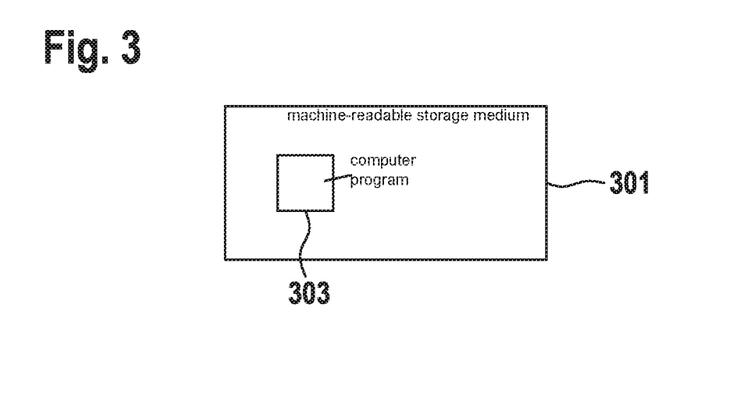
FIG. 3 shows a machine-readable storage medium in accordance with an example embodiment of the present invention.

FIG. 3 shows a machine-readable storage medium 301.

A computer program 303 is stored in machine-readable storage medium 301; the computer program including commands, which, in response to execution of computer program 303 by a computer, cause it to implement a method according to the first aspect.

According to one specific example embodiment of the present invention, an infrastructure or an infrastructure system is provided, which includes, for example, the device according to the second aspect.

Figure 4:
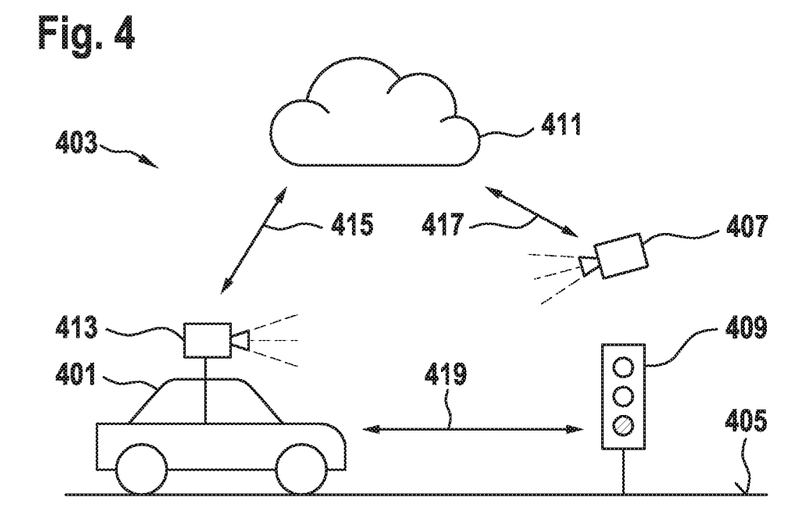
FIG. 4 shows a motor vehicle within an infrastructure in accordance with an example embodiment of the present invention.

FIG. 4 shows a motor vehicle 401, which travels inside of an infrastructure 403.

Infrastructure 403 includes a road 405, on which motor vehicle 401 travels.

Infrastructure 403 further includes a surround sensor 407, a traffic light 409 and a cloud infrastructure 411, in which, for example, the device according to the second aspect is situated and/or provided.

In a specific embodiment not shown, infrastructure 403 includes a plurality of surround sensors, which are positioned so as to be spatially distributed within the infrastructure.

The surround sensors of infrastructure 403 monitor their respective surroundings and supply surround sensor data corresponding to the respective monitoring.

The surrounding-area signals described here are based on the surround sensor data and/or include the surround sensor data.

In a specific embodiment not shown, in addition to, or in place of, traffic light 409, infrastructure 403 includes further traffic systems, such as signs and communication systems.

Motor vehicle 401 includes a roof-side surround sensor 413.

According to FIG. 4, the two surround sensors 407, 413 are represented illustratively as a video camera. It is noted that every surround sensor described here may be used.

In a specific embodiment not shown, in addition to, or in place of surround sensor 413, motor vehicle 401 may even include additional surround sensors, which are situated, for example, at the front end and/or rear end and/or on a side of the motor vehicle.

In addition, three double arrows 415, 417, 419 are drawn in FIG. 4.

These symbolize a specific communication path and/or a specific communication channel between individual elements represented in FIG. 4.

Thus, the double arrow having reference numeral 415 symbolizes a communication path between motor vehicle 401 and cloud infrastructure 411.

The double arrow having reference numeral 417 symbolizes a communication path between surround sensor 407 of infrastructure 403 and cloud infrastructure 411.

The double arrow having reference numeral 419 symbolizes a communication path between motor vehicle 401 and traffic light 409.

In order that motor vehicle 401 may be controlled remotely, according to the concept described here, there is a condition that the entity made up of motor vehicle 401 and elements involved in the method according to the first aspect be safe, that is, safe and secure.

Thus, the elements involved in the method according to the first aspect presently include, in particular, infrastructure 403 and motor vehicle 401. Therefore, according to the exemplary embodiment shown in FIG. 4, the elements of infrastructure 403 are cloud infrastructure 411, surround sensor 407 and traffic light 409.

The specific communication paths 415, 417, 419 between the respective elements also belong to the entity.

Therefore, this means, in particular, that, for example, a communication path 415 between motor vehicle 401 and cloud infrastructure 411 is checked as to whether it is secure.

Accordingly, it is checked, for example, if surround sensor 407 is secure.

According to the present invention, one or more safety conditions are specified as criteria for whether a communication path and/or an element of the entity are secure; the safety conditions having to be satisfied, in order that it may be determined that the corresponding element and/or the corresponding communication path are secure.

For example, a communication path between two elements must have a minimum latency time, in order that the communication path be regarded as secure.

For example, a surround sensor must satisfy certain quality criteria, in order for it to be regarded as reliable.

For example, a surround sensor data processing algorithm, which is executed in a device in cloud infrastructure 411 according to the second aspect must have certain quality specifications.

For example, specific emergency plans must be stored or saved in cloud infrastructure 411, in order that the motor vehicle may be controlled remotely.

In one specific embodiment, remote control includes a change in the drive unit (e.g., for reducing emissions, limiting the speed) and/or specifying a trajectory to be covered (e.g., on the basis of requirements, preventing accidents).

Therefore, this means, in particular, that the remote control signals include adjustment signals for adjusting a drive setting of the drive unit of the motor vehicle, and/or for adjusting a navigation setting of a navigation system of the motor vehicle.

Therefore, this means that the remote control signals do not necessarily have to control lateral and/or longitudinal guidance of the motor vehicle, but may adjust one or more motor vehicle parameters or motor vehicle settings, in particular, a drive setting and/or navigation setting.

In one specific embodiment, in the run-up to the intervention (of the remote control), and according to a further specific embodiment, during the intervention, it is ensured that the intervention and/or the action resulting from it are safe, which means, inter alia, that the intervention does not result in any accidents. Accompanying this, this means, in particular, that the term "safe" and "secure" is necessary, which means, inter alia, that hackers do not change the requirements/actions (For a further explanation of these two English terms, reference is made to the explanations following further down.).

In one specific embodiment, for example, the following is provided:

Analyzing or checking if the at least one safety condition is satisfied. In this case, it is checked, for example, when the remote control is/would be safe for intervention from the outside.

Analyzing or checking if the at least one safety condition is satisfied at the time of the desired intervention.

If yes, carrying out the remote control by generating and outputting corresponding remote control signals.

If no, carrying out no remote control, that is to say, not carrying out the remote control. Therefore, no generation and outputting of corresponding remote control signals.

In a further specific embodiment, during the intervention (of the remote control), it is additionally tested, at regular intervals, if the at least one safety condition continues to be satisfied.

In the case, in which the at least one safety condition is no longer satisfied, for example, emergency remote control signals are generated and outputted on the basis of a specific emergency plan. Preferably, specific emergency plans are analyzed and defined in advance for each possible, individual fault. One emergency plan may be, for example, to bring the vehicle to a dead stop, that is, to a safe driving state, as rapidly as possible. Preferably, in consideration/view of the surroundings, and while warning other road users.

In a further specific example embodiment of the present invention, during the intervention (of the remote control), it is additionally tested, at regular intervals, if the planned remote control and/or its planned result occurs.

If this is not the case, then, for example, a reactionary action is carried out.

In one specific example embodiment of the present invention, a reactionary action may include an additional action, which continues to pursue the original result. E.g., even more deceleration and even more motive power, in order to still attain, e.g., the desired speed after all.

In one further specific example embodiment of the present invention, a reactionary action may include, that the action is interrupted, since it is no longer effective.

In a further specific example embodiment of the present invention, on the basis of an emergency plan, emergency remote control signals are generated and outputted as a function of the situation/fault.

In a further specific example embodiment of the present invention, on the basis of an emergency plan, emergency remote control signals are generated and outputted, in particular, especially in the cases of faults.

The check as to whether the at least one safety condition is satisfied, is based, in particular, on a check as to the requirements and/or conditions, under which the planned remote control is safe.

In this context, the risks, which the action (the remote control) could have, are first analyzed, for example. Especially, whether accidents including damage (to motor vehicles, etc.), but, in particular, including injuries and/or death to parties involved, may be the result.

Then, according to one specific embodiment, it is subsequently tested, how these results may be prevented.

In this context, in particular, it is determined how faults are treated, that is, whether, and if yes, which reactionary actions and/or emergency plans (fallback actions) should be carried out.

In this context, there are, in particular, static requirements and/or conditions and/or, in particular, dynamic requirements and/or conditions, namely, in particular, for the overall system, which is preferably made up of at least a motor vehicle, infrastructure (in particular, traffic systems, sensors and components in the infrastructure), computer systems in the infrastructure and/or in a cloud, and a communication path (e.g., WLAN/WIFI and/or mobile radio communication).

The requirements are in force, in particular, for the overall system and, in the following, in particular, for all parts of the overall system.

In this context, static requirements and/or conditions are preferably analyzed beforehand (prior to remote control) and, as a rule, do not change over time. E.g., which components are present in the operation, and how safe ("safe and secure") are they (in general).

In this context, the current state of dynamic requirements and/or conditions may not be analyzed beforehand and are a function of the current situation. For example:

How is the current environment (number of road users, weather, . . . )?

Do the components currently function in a faultless manner?

However, how which states of the dynamic requirements and/or conditions present at the moment are to be reacted to, is preferably analyzed beforehand. Thus, e.g., may the action (the remote control) be carried out. Or, may the action only be carried out in a limited manner/partially/with restrictions.

In the case of the static requirements or conditions, in particular, the quality, which the overall system must have, and/or the quality, which the involved components must have (availabilities, failure rates, accuracies, . . . ), and/or the quality, which the participating algorithms, methods, procedures (e.g., tests, operations, redundant calculations, . . . ) must have, are analyzed.

In addition, how the overall relationships must be, is particularly analyzed. E.g., the overall dynamic behavior across systems and, consequently, over the individual systems/methods. E.g., how rapidly, where, and how must something be calculated and transmitted (e.g., latency behavior).

In this context, for example, the following are checked (as a function of the specific remote control): (A)SIL's of the overall system, (A)SIL's of the components, (A)SIL's of the procedures/methods, latency times and bandwidths for data transmissions, times for calculations/communications,/reaction functions, safety methodologies (hacker protection), optionally, necessary, redundant/diversitary components/algorithm/communication options, quality of services/availability data/measures for reducing faults/failures/incorrect analyses/misinterpretations, fallback scenarios, premises regarding function/traffic situation/ . . . , premises regarding weather/ . . . , etc.

To this end (for development, analysis of the quality, etc.), there are, inter alia, rules, standards, etc.:

https://de.wikipedia.org/wiki/Sicherheitsanforderungsstufe (safety requirement step)

https://de.wikipedia.org/wiki/ISO_26262

This means, in particular, that requirements/conditions, under which the action can/may be carried out without consequences (accidents, seriously injured persons, fatalities), are analyzed.

In the analysis as to whether the requirements are met at the time of the desired intervention, it is then tested, for example, if the requirements (static, dynamic) are currently fulfilled, that is, satisfied.

And in the following, remote control signals are then generated and outputted accordingly, or simply not, as a function of a result of the analysis.

In this context, the check tests (Requirements currently present? Is the action being carried out correctly? . . . ) may or should preferably be carried out several times (for safety->safe/secure), in particular, using different methods, in particular, on different systems, as well. Therefore, in particular, the testing and/or checking is carried out in a redundant and diverse manner.

Due to the consequences (fatality, etc.), the operation is preferably documented comprehensibly and in a manner safe from falsification, for example, in a blockchain.

According to one specific embodiment, a condition for the remote control or for the intervention is that the remote control is safe. In the spirit of the description, "safe" means, in particular, "safe" and "secure." Actually, these two English terms are normally translated into German as "sicker". Nevertheless, these have a partially different meaning in English.

The term "safe" is directed, in particular, to the topic of accident and accident prevention. Remote control, which is "safe," causes, in particular, a probability of an accident or a collision to be less than or less than or equal to a predetermined threshold probability value.

The term "secure" is directed, in particular, to the topic of computer protection and/or hacker protection, that is, in particular, how securely is a (computer) infrastructure and/or a communications infrastructure, in particular, a communication path between a motor vehicle and a remote control device for controlling a motor vehicle remotely, protected from unauthorized access and/or from data manipulation by a third party (hacker).

Thus, remote control, which is "secure," has, in particular, appropriate and sufficient computer protection and/or hacker protection as a basis.

For example, according to one specific example embodiment of the present invention, it is tested if the entity made up of a motor vehicle and infrastructure involved in the method according to the first aspect, including communication between the infrastructure and the motor vehicle, is currently secure for the plan "intervention in the motor vehicle for critical actions" described here. Therefore, this means, in particular, that the motor vehicle and/or a local and/or a global infrastructure and/or communication are appropriately tested. In particular, the remote control signals are generated on the basis of a result of the test.

Thus, this means, in particular, that the components, which are used during the execution of the method according to the first aspect, are tested for safety, that is, as to whether these satisfy specific safety conditions, before the intervention in the vehicle operation is carried out, that is, before the motor vehicle is controlled remotely.

Important or dependent criteria include, for example, one or more of the safety conditions described above.

According to one specific example embodiment of the present invention, first of all, the overall system (motor vehicle, infrastructure, communication path, cloud, . . . ) is tested with regard to the safety condition.

According to one specific example embodiment of the present invention, the individual parts are also tested with regard to satisfying the safety condition. This, in particular, prior to controlling the motor vehicle remotely.

In this context, in one specific example embodiment of the present invention, the testing step(s) are executed inside the motor vehicle and/or outside the motor vehicle, in particular, in an infrastructure.

According to one specific example embodiment of the present invention, the checking step(s) are tested subsequently, that is, at a later time, for example, at regular intervals. For example, the testing step(s) are tested subsequently at a predetermined frequency, for example, every 100 ms.

For example, according to one specific example embodiment of the present invention, this testing, that is, the test as to whether the at least one safety condition is satisfied, is carried out prior to and/or after and/or during one or more predetermined method steps.

According to one specific example embodiment of the present invention, the testing is carried out or executed in response to problems.

What is claimed is:

1. A method for controlling a motor vehicle remotely, comprising the following steps:
receiving safety condition signals, which represent at least one safety condition that must be satisfied, so that the motor vehicle may be controlled remotely;
checking whether the at least one safety condition is satisfied;
generating remote control signals for controlling the motor vehicle remotely, based on a result of the check as to whether the at least one safety condition is satisfied; and
outputting the generated remote control signals,
wherein after the outputting of the remote control signals, remote control of the motor vehicle is tested based on the output remote control signals in order to detect a fault, and wherein, in response to the detection of a fault, the remote control is interrupted, or emergency remote control signals for controlling the motor vehicle remotely in an emergency are generated and output,
wherein emergency plan signals are received, which represent an emergency plan specific to the detected fault, and the emergency remote control signals are generated based on the specific emergency plan,
wherein it is additionally tested, at regular intervals, if the emergency plan signals were received and/or if the emergency remote control signals were generated, wherein if the emergency plan signals were not received or if the emergency remote control signals were not generated, a reactionary action is carried out.

2. The method as recited in claim 1, wherein the at least one safety condition includes at least one of the following safety conditions: (i) presence of a predetermined safety integrity level or automotive safety integrity level of at least the motor vehicle and an infrastructure including a communication path and/or communications components, for controlling a motor vehicle remotely, (ii) presence of a maximum latency time of a communication between the motor vehicle and a remote control device for controlling the motor vehicle remotely based on the remote control signals, (iii) presence of a predetermined computer protection level of a device for executing the method steps, (iv) presence of predetermined components and/or algorithms and/or communication options, which are used for executing the method steps, (v) presence of redundancy and/or diversity in predetermined components and/or algorithms and/or communication options, which are used for executing the method steps, (vi) presence of predetermined availability information, which indicates an availability of predetermined components and/or algorithms and/or communication options, (vii) presence of predetermined quality criteria of the predetermined components and/or algorithms and/or communication options, (viii) presence of a plan, which includes measures for reducing faults and/or measures in response to failures of predetermined components and/or algorithms and/or communication options and/or measures for incorrect analyses and/or measures in response to incorrect interpretations; presence of one or more fallback scenarios, (ix) presence of a predetermined function, (x) presence of a predetermined traffic situation, (xi) presence of predetermined weather, (xii) presence of a maximum possible time for a specific performance or execution of one method step or a plurality of method steps, (xiii) presence of a test result, that elements or functions, which are used for executing the method, are presently functioning correctly.

3. The method as recited in claim 1, wherein the remote control signals are generated only when the at least one safety condition is satisfied.

4. The method as recited in claim 1, wherein the check as to whether the at least one safety condition is satisfied, is carried out prior to and/or after and/or during one or more predetermined method steps.

5. The method as recited in claim 1, wherein the testing of the remote control includes the check as to whether the at least one safety condition is satisfied, and wherein the fault is determined when it is determined that the at least one safety condition is not satisfied.

6. The method as recited in claim 1, wherein the testing of the remote control includes a check as to whether a result to be achieved by the remote control is achieved, and wherein a fault is determined when a result of the check as to whether the result to be achieved by the remote control is achieved which indicates that the result to be achieved by the remote control has not been achieved.

7. The method as recited in claim 6, wherein further remote control signals for controlling the motor vehicle remotely based on the result to be achieved are generated and outputted in order to achieve the result, and wherein the motor vehicle is controlled remotely based on the further remote control signals.

8. The method as recited in claim 1, wherein the check as to whether the at least one safety condition is satisfied, includes a check as to whether the at least one safety condition is satisfied at a predetermined time.

9. The method as recited in claim 1, further comprising the following steps:
- receiving situation signals which represent a situation in which the motor vehicle finds itself;
- receiving table signals which represent a table that affixes predetermined situations to predetermined requirements for controlling a motor vehicle remotely; and
- assigning the situation in which the motor vehicle finds itself to one of the predetermined situation;
- wherein the remote control signals are generated based on the requirement for controlling a motor vehicle remotely corresponding to the one predefined situation.

10. The method as recited in claim 1, wherein the one or more method steps are executed inside the motor vehicle, and/or the one or more of the method steps are executed outside of the motor vehicle in an infrastructure.

11. The method as recited in claim 1, wherein one or more of the method steps are executed outside of the motor vehicle in a cloud infrastructure.

12. The method as recited in claim 1, wherein the method steps are documented in a blockchain.

13. The method as recited in claim 1, further comprising:
- testing whether an entity made up of the motor vehicle and infrastructure involved in the method, including communication between the infrastructure and the motor vehicle, is secure.

14. A device for controlling a motor vehicle remotely, the device comprising a processor, wherein the processor is programmed to:
- receive safety condition signals, which represent at least one safety condition that must be satisfied, so that the motor vehicle may be controlled remotely;
- check whether the at least one safety condition is satisfied;
- generate remote control signals for controlling the motor vehicle remotely, based on a result of the check as to whether the at least one safety condition is satisfied; and
- output the generated remote control signals,
- wherein after the outputting of the remote control signals, remote control of the motor vehicle is tested based on the output remote control signals in order to detect a fault, and wherein, in response to the detection of a fault, the remote control is interrupted, or emergency remote control signals for controlling the motor vehicle remotely in an emergency are generated and output,
- wherein emergency plan signals are received, which represent an emergency plan specific to the detected fault, and the emergency remote control signals are generated based on the specific emergency plan,
- wherein it is additionally tested, at regular intervals, if the emergency plan signals were received and/or if the emergency remote control signals were generated, wherein if the emergency plan signals were not received or if the emergency remote control signals were not generated, a reactionary action is carried out.

15. A non-transitory machine-readable storage medium on which is stored a computer program for controlling a motor vehicle remotely, the computer program, when executed by a computer, causing the computer to perform the following steps:
- receiving safety condition signals, which represent at least one safety condition that must be satisfied, so that the motor vehicle may be controlled remotely;
- checking whether the at least one safety condition is satisfied;
- generating remote control signals for controlling the motor vehicle remotely, based on a result of the check as to whether the at least one safety condition is satisfied; and
- outputting the generated remote control signals,
- wherein after the outputting of the remote control signals, remote control of the motor vehicle is tested based on the output remote control signals in order to detect a fault, and wherein, in response to the detection of a fault, the remote control is interrupted, or emergency remote control signals for controlling the motor vehicle remotely in an emergency are generated and output,
- wherein emergency plan signals are received, which represent an emergency plan specific to the detected fault, and the emergency remote control signals are generated based on the specific emergency plan,
- wherein it is additionally tested, at regular intervals, if the emergency plan signals were received and/or if the emergency remote control signals were generated, wherein if the emergency plan signals were not received or if the emergency remote control signals were not generated, a reactionary action is carried out.

\* \* \* \* \*